United States Patent
Losse, II et al.

(10) Patent No.: US 9,869,476 B1
(45) Date of Patent: Jan. 16, 2018

(54) NON-ELECTRIC FORCED AIR HEATING AND COOLING APPARATUS

(71) Applicants: Valdemar R. Losse, II, Traverse City, MI (US); Valdemar R. Losse, Ann Arbor, MI (US)

(72) Inventors: Valdemar R. Losse, II, Traverse City, MI (US); Valdemar R. Losse, Ann Arbor, MI (US)

( * ) Notice: Subject to any disclaimer, the term of this patent is extended or adjusted under 35 U.S.C. 154(b) by 51 days.

(21) Appl. No.: 15/014,420

(22) Filed: Feb. 3, 2016

Related U.S. Application Data (60) Provisional application No. 62/170,173, filed on Jun. 3, 2015.

(51) Int. Cl.
   F24F 3/00 (2006.01)
   F24F 3/06 (2006.01)
   F24F 1/00 (2011.01)
   F24H 3/08 (2006.01)

(52) U.S. Cl.
   CPC .............. *F24F 3/06* (2013.01); *F24F 1/0007* (2013.01); *F24H 3/08* (2013.01)

(58) Field of Classification Search
   CPC .. F24F 3/06; F24F 1/007; F24F 11/006; F24F 11/008; F24H 3/08
   USPC .......................................................... 165/50
   See application file for complete search history.

(56) References Cited

U.S. PATENT DOCUMENTS

| | | | |
|---|---|---|---|
| 2,165,854 A | 7/1939 | Headrick | |
| 3,934,644 A | 1/1976 | Johnston | |
| 4,192,456 A | 3/1980 | Shields et al. | |
| 4,259,268 A * | 3/1981 | DiRoss | F24F 12/002 261/151 |
| 4,461,246 A | 7/1984 | Clemente | |
| 4,907,654 A * | 3/1990 | Eberhardt | A62C 3/0207 169/15 |
| 4,955,585 A | 9/1990 | Dickerson | |
| 5,560,222 A | 10/1996 | Perron | |
| 5,606,865 A | 3/1997 | Caron | |
| 6,158,216 A | 12/2000 | Buschur et al. | |
| 6,732,681 B1 | 5/2004 | Hendricks, Sr. | |
| 8,228,675 B2 | 7/2012 | Koplow | |
| 2004/0020237 A1* | 2/2004 | Burger | F24F 5/0017 62/434 |
| 2008/0000243 A1* | 1/2008 | Yoshimi | F24F 3/001 62/160 |

(Continued)

FOREIGN PATENT DOCUMENTS

| | | |
|---|---|---|
| CN | 203550653 U | 4/2014 |
| ZA | 9300731 A * | 12/1993 |

*Primary Examiner* — Davis Hwu
(74) *Attorney, Agent, or Firm* — Northern Michigan Patent Law, PLC (57) ABSTRACT

A temporary or emergency heating and cooling apparatus and method for use in households without electrical power, but still supplied with water pressure and hot water, and with water discharge to a suitable open-loop discharge location such as a sewer or drain field. The apparatus in a preferred form comprises a water-powered fan adapted to be temporarily connected to a household cold water tap, a radiator thermally coupled to the fan flow path for heat transfer and supplied with either hot or cold water from a household tap, and a water discharge connection from the water-powered fan and the radiator to a household discharge or drain.

5 Claims, 7 Drawing Sheets

(56) References Cited

U.S. PATENT DOCUMENTS

2008/0211232 A1 9/2008 Helfrich
2009/0101366 A1* 4/2009 Denardo ............... A62C 5/002
169/14

* cited by examiner

NON-ELECTRIC FORCED AIR HEATING AND COOLING APPARATUS

RELATED APPLICATIONS/PRIORITY BENEFIT CLAIM

This application claims the benefit of U.S. Provisional Application No. 62/170,173, filed Jun. 3, 2015 by the same inventors (Losse et al.), the entirety of which provisional application is hereby incorporated by reference.

FIELD

The subject matter of the present application is in the field of fluid-powered forced air heating and cooling devices and systems.

BACKGROUND

Modern residential forced-air heating and cooling systems rely on electricity to supply heating and cooling air. The main drawback of such systems is failure during electrical power outages. Modern compressor type air conditioning/cooling systems also use enormous amounts of electricity, which increases the likelihood of power grid failures, has a negative impact on the environment, and costs consumers money.

Space heaters are a common supplement, alternative, or backup to forced-air heating systems, but currently account for many fatal house fires, killing over 600 people and causing close to a billion dollars in damage annually.

Electric fans are the primary alternative to modern air conditioning systems, but they also fail during power outages, and it is not uncommon for vulnerable people to die from heat stroke.

Hydraulic-powered forced air heating and cooling apparatus is known for vehicle heating and cooling systems, with a fan driven by a hydraulic motor blowing air across a fluid-filled radiator. Examples include those shown in U.S. Pat. No. 3,934,644 to Johnston and U.S. Pat. No. 6,158,216 to Buschur et al. Such systems do not appear to have been commonly used, however, even in the limited field of vehicle heating and cooling systems.

Hydraulically (usually water) driven fans are known for outdoor industrial uses, for example to cool heavy equipment at natural gas wells. It is also believed that water-driven fans were used for direct forced-air residential cooling in the 19$^{th}$ century, before household electricity was known or commonplace.

BRIEF SUMMARY

We have invented a non-electric forced-air heating and cooling apparatus and method useful for a building or home where water pressure is available, especially where hot water is heated non-electrically (e.g. with natural gas, propane, oil, or solar). The apparatus and method are optimally useful where the water pressure is supplied by a municipality that maintains water pressure during power outages, but is not limited to municipal residential settings as long as water pressure is available The apparatus comprises a water-powered fan with a temporary hose connection to a cold water tap in the house; a radiator coupled to the fan flow path, the radiator supplied with heat transfer fluid by a temporary hose connection to a hot water tap in the house for heating, or to a cold water tap for cooling; and a temporary water discharge hose connection from the water-powered fan and radiator to a household drain connected to a sewer system, or re-used within the household, or discharged to a ground water replenishment system.

The method comprises supplying a water-powered fan with cold water from a household tap via temporary hose connection; supplying a radiator coupled to the fan flow path with heat transfer fluid in the form of hot or cold water from a household tap for heating or cooling, respectively, and discharging water from the fan and radiator to a household drain for re-use, discharge, or groundwater replenishment.

"Tap" is generally used herein to mean any pressurized water supply outlet in a home or building, such as faucets and spigots, to which a temporary hose connection is made. "Coupled" with respect to the radiator and the fan is not limited to mechanical connection or integration of the radiator and fan, but means an operative air-flow heat exchange relationship, in which the air moved by the fan transfers heat to and from the radiator. "Household" will be used to include both residential and non-residential settings where temporary, small scale room or space heating or cooling is useful.

These and other features and advantages of the invention will become apparent from the detailed description below, in light of the accompanying drawings.

DETAILED DESCRIPTION

Figure 1:
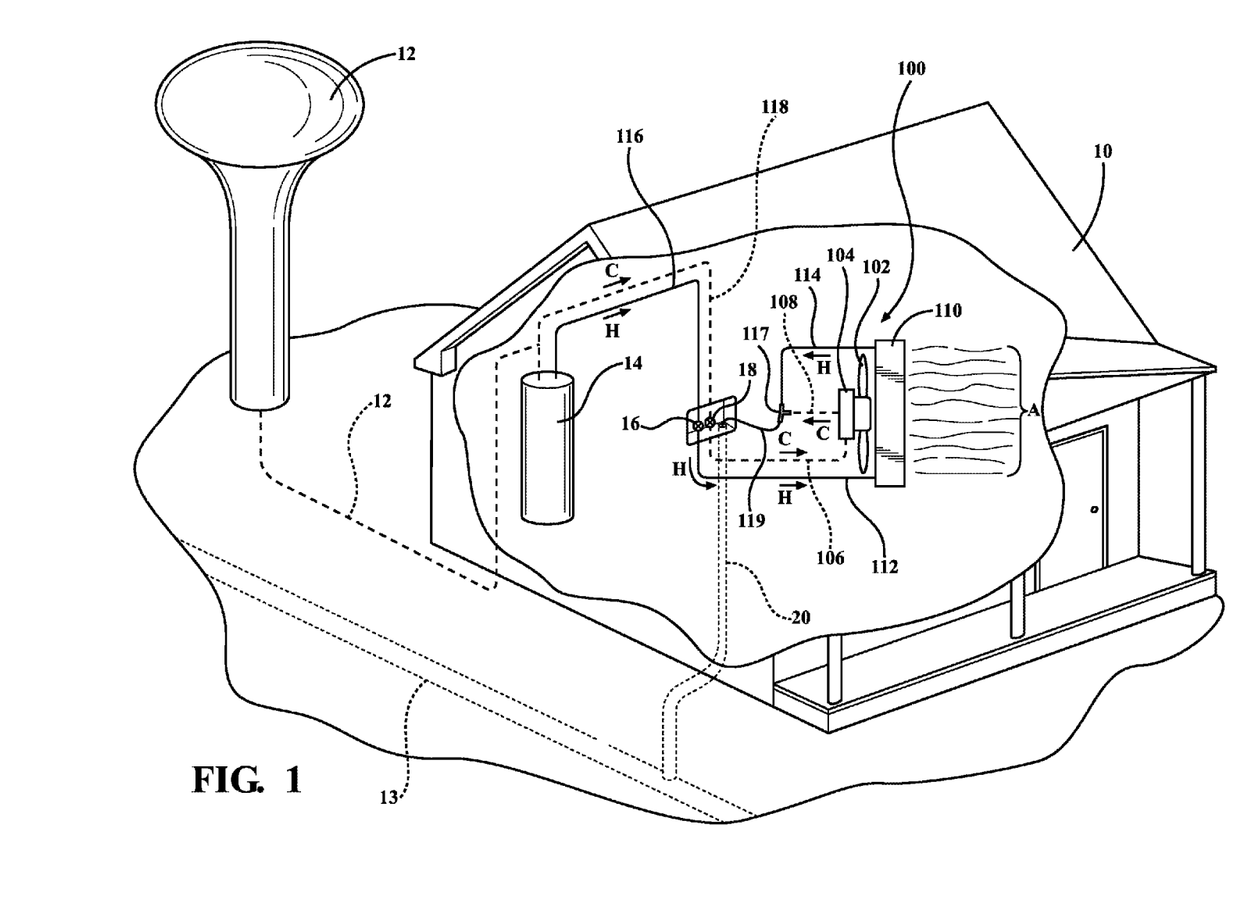
FIG. 1 is a schematic side elevation view of a heating and cooling apparatus according to the invention, in heating mode.

Referring first to FIG. 1, a heating and cooling apparatus 100 is shown in exemplary form in order to teach how to make and use the claimed invention. Apparatus 100 is shown coupled to the hot and cold water system in a household 10 supplied with essentially continuous water pressure (preferably hot water if heating is desired, cold water if cooling is desired) when electrical power is interrupted, for example during a storm. In the example of FIG. 1, household 10 receives water pressure from a municipal water storage supply 12, discharges the water into a municipal sewer 13, and produces hot water with a water heater 14 that does not rely on electricity (e.g., a gas water heater with pilot- or piezo-type ignition). While a municipal water supply of essentially unlimited pressure and a municipal sewer of essentially unlimited capacity are preferred supply and discharge points, the apparatus 100 could be used with non-municipal water supply and/or discharge arrangements such as off-grid or private wells and large drain fields, dry wells, in-home water recirculation systems, lawns, irrigation ditches, etc. where the quantity of water used and discharged does not overload the supply and/or discharge capacity. The water pressure supply and discharge system with which apparatus 100 is used will be referred to as "open-loop", since it is an essentially one-way system in which the water supply into the household to power apparatus 100 is discharged into a suitable sewer, groundwater system, etc., even if temporarily re-used or re-circulated in the household.

In the illustrated example, hot and cold water in household 10 is obtained from hot and cold water taps 16, 18 plumbed in known manner to hot and cold supply lines 116, 118. Supply lines 116, 118 in turn receive water directly from water heater 14 and cold water supply line 12, respectively. Discharge of water from household 10 occurs via one or more drain lines 20 connected to sewer 13 in known manner.

Apparatus 100 includes a water-powered fan 102 powered by a hydraulic motor 104. Fans and hydraulic motors are separately well-known. In the illustrated example a working fan/motor unit was fashioned from an electric box fan, with the electric motor replaced by a hydraulic motor in the form of a radial impeller pump, with the impeller's output shaft— connected to drive the fan rotor shaft. Water for driving the impeller is input to the impeller housing under pressure at an inlet port via temporary hose connection 106 from cold water tap 18, the drive water being discharged from an outlet port in the impeller housing via temporary hose connection 108 to drain 20.

Apparatus 100 further includes a radiator 110 coupled to the air flow path A of fan 102. In the illustrated example, radiator 110 is placed in front of fan 102 so that forced air A is pushed through the radiator across the radiator's heat exchange surfaces (e.g., fins and/or tubes). Radiator 100 may take any known form, provided that it can use water as a heat transfer fluid in its internal channels. Heating and cooling water is supplied to an inlet port in radiator 110 via temporary hose connection 112 to one of the hot and cold water taps 16, 18. In the illustrated example of FIG. 1, apparatus 100 is connected for a heating mode, with temporary hose connection 112 connected to hot water tap 16. After traveling through radiator 110 to warm its heat exchange surfaces, the hot water is discharged from an outlet in the radiator via temporary hose connection 114 to drain 20.

In the illustrated example of FIG. 1, the substantially continuous flows of water discharged from fan motor 104 and radiator 110 are directed through a common discharge "T" at 117 and combined in a single discharge line 119 to a single drain 20. It is also possible to discharge the water from fan motor 104 and radiator 110 to two separate drains 20 via two independent discharge hoses.

While radiator 110 is shown coupled to the air flow path A of fan 102 in front of the fan, it is also possible to couple radiator 110 to the air flow path of fan 102 behind the fan, such that the fan pulls air through the radiator.

Figure 2:
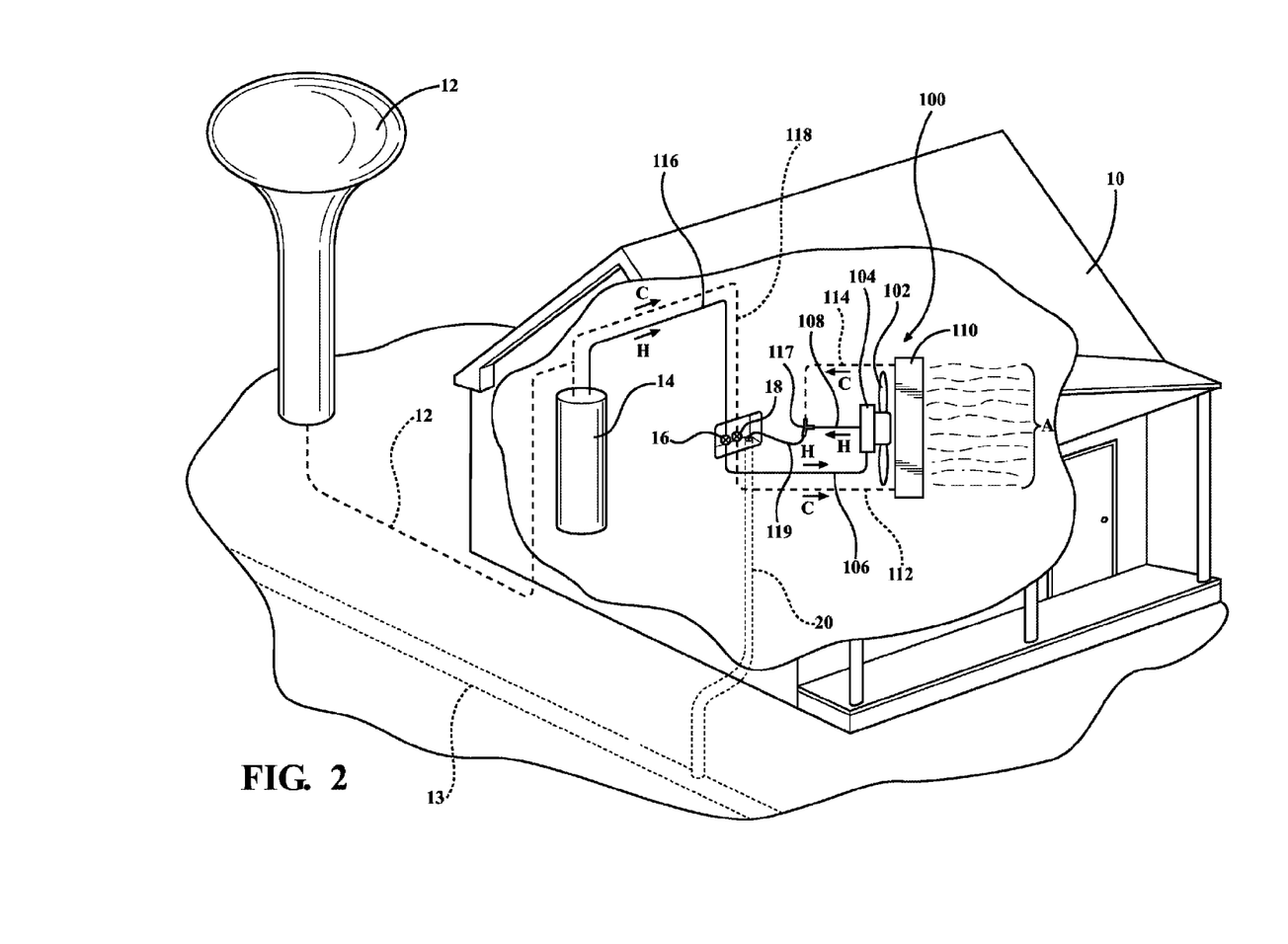
FIG. 2 is a schematic side elevation view of the heating and cooling apparatus of FIG. 1 in cooling mode.

Although fan 102 and radiator 110 are shown as physically separate in the schematic of FIGS. 1 and 2, it is desirable to mechanically connect or integrate them in a single unit or housing, as shown in subsequent Figures. This is especially true where the apparatus 100 is intended as a temporary, portable unit.

FIG. 2 is similar to FIG. 1, except that the water inputs from the hot and cold taps 16, 18 have been reversed with respect to the fan motor 104 and the radiator 110, for a cooling mode. Hot water from tap 16 is input to motor 104 to drive fan 102, while cold water from tap 18 is input to radiator 110 to cool the air A flowing through it.

It will be appreciated by those skilled in the art that the efficiency of hydraulic motor 104 is desirable in order to achieve high volume air flow with household water pressure, especially where municipalities monitor water use. By way of example, the illustrated hydraulic motor 104 includes an impeller with an energy efficient geometry; an inlet and outlet port sizing to facilitate the smooth flow of water through the motor; a submerged ball bearing for the impeller, submerged if used in a watertight housing; and a preferably watertight housing, although non-watertight housings are possible if the apparatus is used near a sink or convenient drain location.

Figure 3:
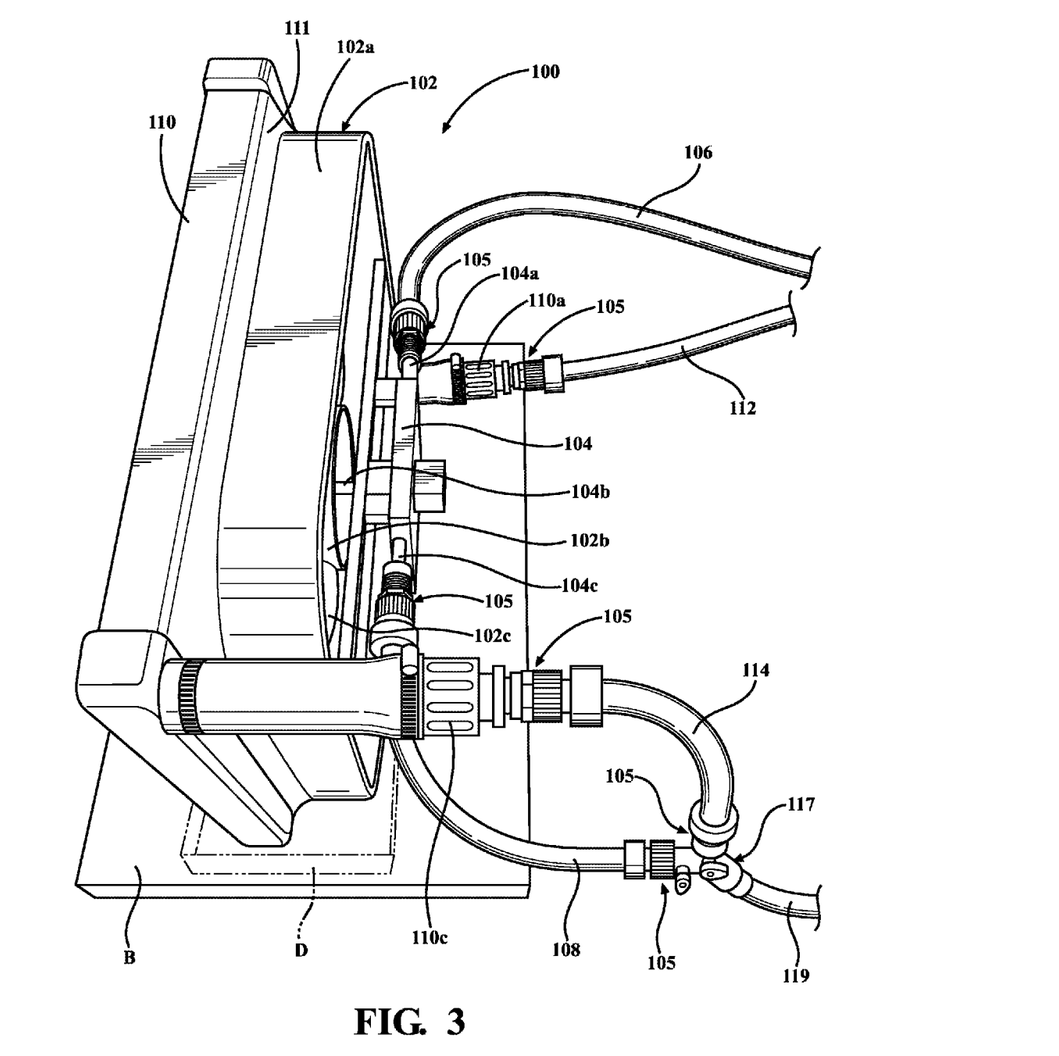
FIG. 3 is a perspective side view of an apparatus based on the schematic of FIG. 1.
Figure 4:
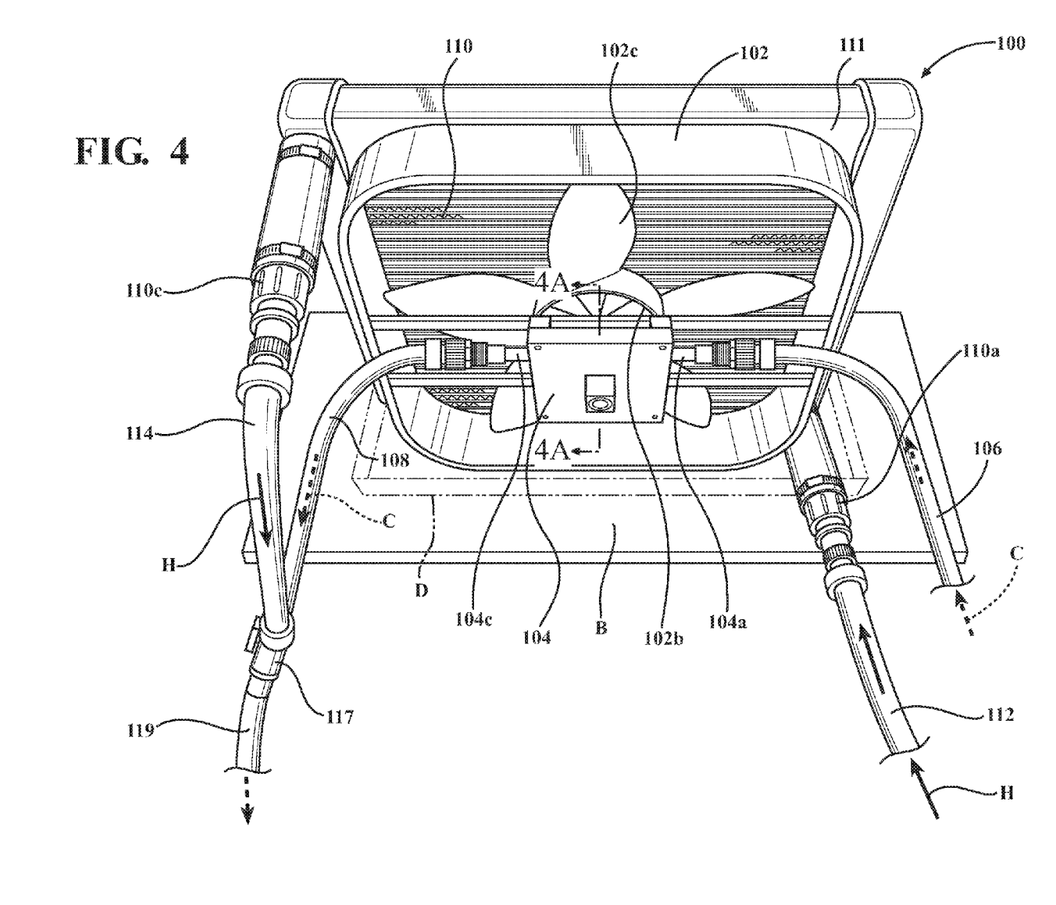
FIG. 4 is a perspective rear view of the apparatus of FIG. 3, connected for heating mode.
Figure 4A:
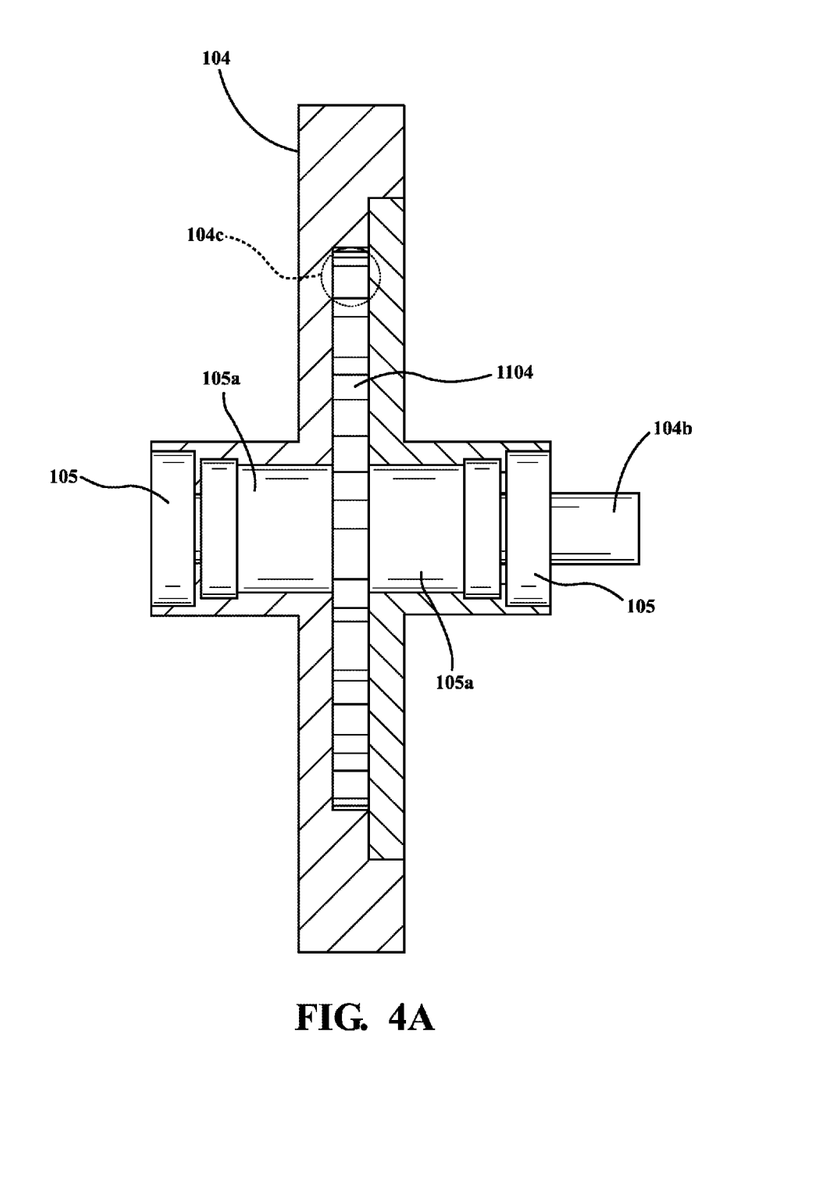
FIG. 4A is a section view of the impeller housing of FIG. 4.
Figure 5:
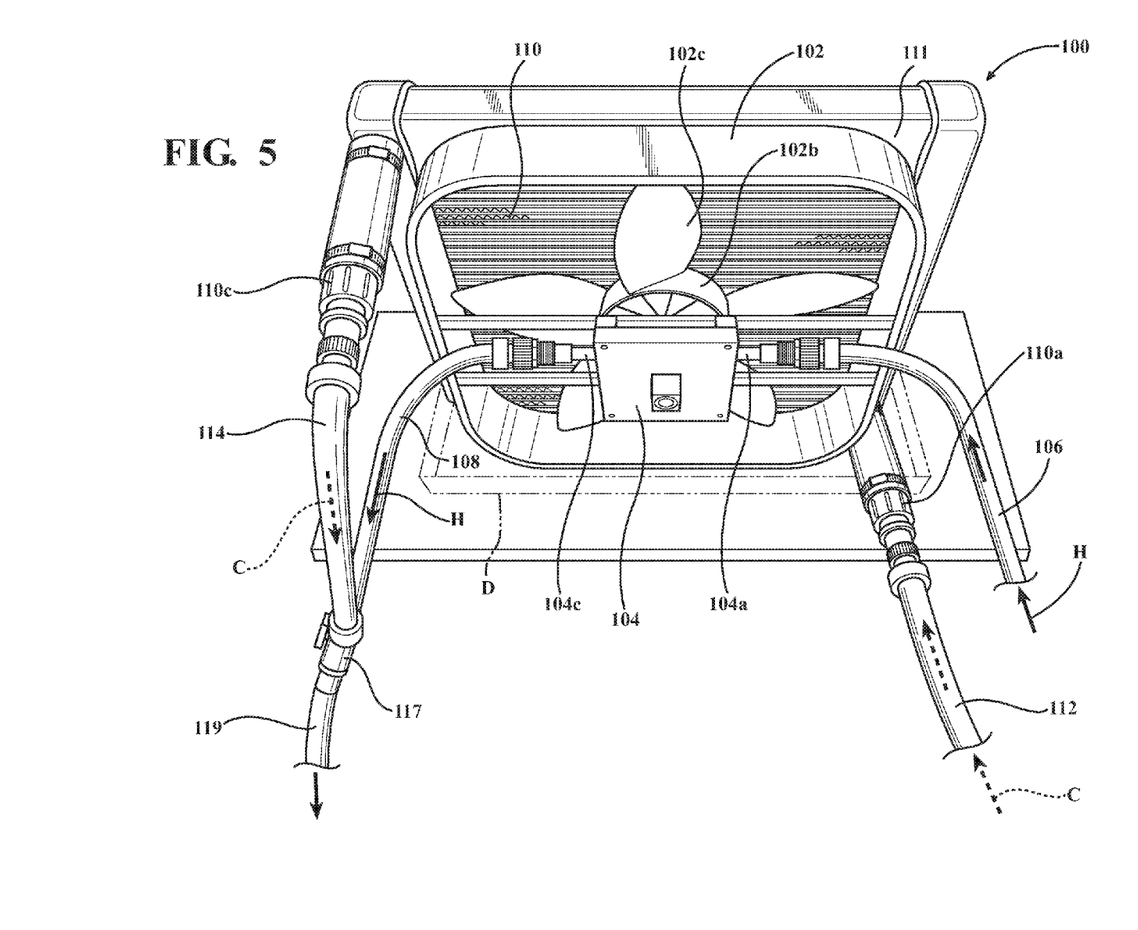
FIG. 5 is a perspective rear view of the apparatus of FIG. 3, connected for cooling mode.

Referring next to FIGS. 3 through 5, an actual heating and cooling apparatus according to the invention is shown in detail, with water-powered fan 102 having a housing 102a integrated at its forward end by a duct or housing 111 to a correspondingly sized water radiator 110 of the tube-and-fin type, by way of non-limiting example on the order of 20×20-inches. Fan 102 and radiator 110 (along with all other structure in apparatus 100 with the exception of the hoses) may be further integrated with a frame, cabinet, or baseplate B so that the apparatus may be carried and stored as a unit. In the illustrated example a simple baseplate B is shown so that the operative structure is visible.

Fan 102 is a box-type fan, but with a hydraulic motor 104 integrated with the housing and having an output shaft 104b in driving relationship with the hub 102b of fan rotor 102c. Motor 104 is supplied with drive water at inlet 104a by hose 106 attached with a common temporary threaded coupling 105, similar to a garden hose. Drive water is discharged from motor 104 at outlet 104c through a hose 108 temporarily connected with a similar temporary coupling 105. While standard garden hose fittings are currently preferred, adapters for use on non-threaded or non-standard faucets and the like are either available or easily made.

Hydraulic motor 104 (FIG. 4A) includes an internal impeller 1104 sealed to rotate in a circular chamber in the illustrated watertight housing and connected to output shaft 104b, the shaft mounted to rotate on one or more bearings 105 with mechanical seals 105a in known manner. Water from inlet 104a rotates impeller 1104 by acting against the impeller's vanes in known manner to drive the output shaft and thus the fan 102. Clearance between the impeller and the sides and front and rear faces of the housing is preferably kept to a minimum for efficiency, by way of non-limiting example on the order of 0.010" (inches) between the faces of the impeller and the inner front and rear faces of the housing, and on the order of 0.020" (inches) between the outer diameter of the impeller as measured at the vanes and the inner diameter of the housing around the impeller.

Radiator 110 is supplied with heating or cooling water at inlet 110a by a hose 112, temporarily connected with a coupling 105. The heating/cooling water is discharged from outlet 110c through a hose 114 temporarily connected with a coupling 105.

FIG. 4 shows the apparatus 100 in heating mode, with hot water represented by solid arrows H input to radiator 110, and cold water represented by dotted-line arrows C used to drive fan motor 104. FIG. 5 shows the apparatus 100 in cooling mode, with cold water C input to radiator 110, and hot water H used to drive fan motor 104. When used in cooling mode in a humid environment, a large amount of water will be removed from the air via condensation on the radiator surfaces; under such conditions it is desirable to use a drip pan D under the radiator, the pan being emptied from time to time depending on ambient humidity.

Using hot water to drive fan motor 104 in cooling mode would typically be more expensive than using cold water. Accordingly, cold water from the same or a different cold water tap could be used to drive the fan motor in cooling mode if a second tap is available, or if a split connector is used to supply motor supply hose 106 and radiator supply hose 112 from the same cold water tap. Alternately, a hot water tap can be used more cost-effectively to drive the motor if the thermostat on the hot water heater is turned down or set in vacation mode.

Figure 6:
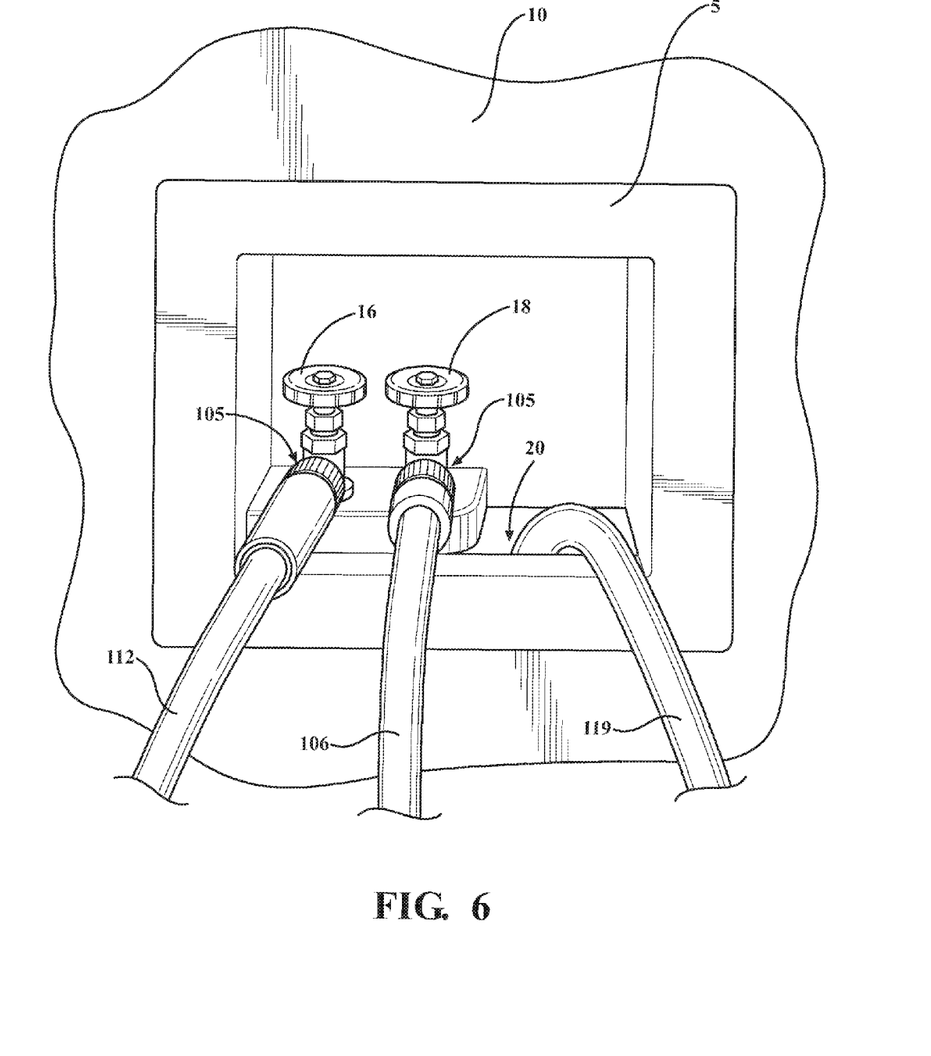
FIG. 6 is a perspective front view of the supply and discharge hoses of the apparatus of FIG. 3 connected to household cold and hot water taps and a drain.

FIG. 6 shows the supply and discharge hoses 106, 112, and 119 temporarily connected to the hot and cold water taps and drain 18, 16, and 20, respectively, for example in a laundry room water supply/discharge station S in household 10. The connections shown in FIG. 6 are for apparatus 100 in a heating mode; the hoses 106 and 112 would be reversed on water taps 16 and 18 for the cooling mode. As with the hose connections to the various inlets and outlets on apparatus 100, all connections at station S are temporary threaded couplings 105, for example male/female threaded garden hose type connections. Couplings for adapting non-threaded household taps for such temporary threaded connections are commonly available at hardware and plumbing supply stores, if the taps do not have this capability in their original form.

Description of Operation

In operation, the apparatus 100 may be used when a temporary space heater is needed without the risk of fire, or where emissions due to combustion are unacceptable; when a temporary air conditioner is needed; or when electrical power to the household is either unavailable or interrupted for a significant period of time, putting the household's regular forced-air heating/cooling system out of operation. The user would typically pull apparatus 100 out of convenient storage, for example in a closet near the laundry water supply/discharge station S, the various hoses would be connected between the water taps at station S and appropriate inlets and outlets on apparatus 100 according to the desired heating or cooling mode, and the apparatus 100 would supply an unlimited quantity of heating or cooling air as long as hot water or water pressure were available to the household.

The disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A non-electric forced-air heating and cooling apparatus for heating and cooling an interior of a building with an open-loop water pressure supply and water discharge system, comprising:

a water-powered fan comprising a hydraulic impeller motor including a first temporary water hose connection inlet configured to be temporarily connected to and driven by drive water from an open-loop building water supply tap, and a drive water outlet configured to receive and discharge substantially all of the drive water received through the first temporary water hose connection inlet;

a non-evaporative fluid radiator coupled to the fan air flow path to transfer heat to or from the air flow delivered by the fan to the building interior, the fluid radiator including a second temporary water hose connection inlet configured to be temporarily connected to an open-loop supply of hot or cold water from an open-loop building water supply tap such that the fluid radiator is internally heated or cooled by the hot or cold water therefrom, the fluid radiator further including a radiator water outlet configured to receive and discharge substantially all of the hot or cold water received through the second temporary water hose connection inlet; and, a water discharge hose connection coupled to each of the water-powered fan drive water outlet and the radiator water outlet to receive and discharge substantially all of the drive water and hot or cold water therefrom, the water discharge hose connection being a temporary hose connection configured to be temporarily connected to the water discharge system.

2. The apparatus of claim 1, wherein each of the water-powered fan and the fluid radiator has a separate water discharge hose connection.

3. The apparatus of claim 1, wherein the water-powered fan and the fluid radiator share a common water discharge hose connection.

4. The apparatus of claim 1, wherein the building has hot water, and wherein one of the water-powered fan and fluid radiator is coupled to a cold water tap, and one of the water-powered fan and fluid radiator is coupled to a hot water tap.

5. A method for non-electrically heating or cooling one or more rooms in the interior of a building having water taps receiving water pressure from an open-loop water pressure supply and further having a water discharge system, the method comprising:

driving a hydraulic impeller type water-powered fan located in the interior of the building with cold drive water in a substantially continuous flow from one of the water taps via temporary hose connection to rotate the water-powered fan;

supplying a non-evaporative fluid radiator thermally coupled to an air flow path of the water-powered fan in the interior of the building with internal heat transfer fluid in the form of hot or cold water in a substantially continuous flow from one of the water taps via temporary hose connection to heat or cool the air flow from the water-powered fan, respectively; and, discharging substantially all of the substantially continuous flows of water from the water-powered fan and the fluid radiator to the water discharge system.

* * * * *